United States Patent
Maiwand et al.

(10) Patent No.: US 10,030,987 B2
(45) Date of Patent: Jul. 24, 2018

(54) SYSTEM AND METHODOLOGIES FOR VISUAL RELEVANCY-GRADING OF A NAVIGATION MAP

(71) Applicants: VOLKSWAGEN AG, Wolfsburg (DE); AUDI AG, Ingolstadt (DE)

(72) Inventors: Heiko Maiwand, San Francisco, CA (US); William Brian Lathrop, San Jose, CA (US); Erik Glaser, San Francisco, CA (US); Marco Antonio Lobato Fregoso, San Francisco, CA (US)

(73) Assignees: Volkswagen AG (DE); Audi AG (DE)

( * ) Notice: Subject to any disclaimer, the term of this patent is extended or adjusted under 35 U.S.C. 154(b) by 0 days.

(21) Appl. No.: 14/614,772

(22) Filed: Feb. 5, 2015

(65) Prior Publication Data
US 2016/0231132 A1 Aug. 11, 2016

(51) Int. Cl.
*G01C 21/36* (2006.01)
(52) U.S. Cl.
CPC ........... *G01C 21/36* (2013.01); *G01C 21/367* (2013.01)
(58) Field of Classification Search
CPC ............ G01C 21/3492; G01C 21/3691; G06Q 10/02; G06Q 10/06; G06Q 50/30; G07C 5/08; G08G 1/096811; G08G 1/096816; G08G 1/096838; G08G 1/096844; G08G 1/096866; G08G 1/096872; G08G 1/096833; G08G 1/096888; G08G 1/163; G01R 33/0035
USPC .......... 701/70, 117, 532; 705/13; 455/569.2, 455/404.2; 340/539.13, 575; 345/629; 324/244

See application file for complete search history.

(56) References Cited

U.S. PATENT DOCUMENTS

| | | | |
|---|---|---|---|
| 6,178,380 B1 | 1/2001 | Millington | |
| 6,922,634 B2* | 7/2005 | Odakura | G01S 19/13 340/539.13 |
| 8,699,991 B2* | 4/2014 | Fasold | G09B 29/007 455/404.2 |
| 2001/0029425 A1* | 10/2001 | Myr | G01C 21/3492 701/117 |
| 2005/0272478 A1* | 12/2005 | Larson | G07C 5/08 455/569.2 |
| 2009/0192704 A1* | 7/2009 | Geelen | G01C 21/36 701/532 |
| 2010/0238034 A1* | 9/2010 | Gunaratne | A61B 5/18 340/575 |
| 2011/0313633 A1* | 12/2011 | Nath | G01C 21/3691 701/70 |
| 2014/0067491 A1* | 3/2014 | James | G06Q 50/30 705/13 |
| 2015/0339848 A1* | 11/2015 | Barnes | G06T 17/05 345/629 |
| 2016/0146903 A1* | 5/2016 | Yang | G01R 33/0035 324/244 |

* cited by examiner

*Primary Examiner* — Anne M Antonucci
*Assistant Examiner* — Sanjeev Malhotra
(74) *Attorney, Agent, or Firm* — Barnes & Thornburg LLP

(57) ABSTRACT

An in-vehicle system and method for presenting a relevancy-graded navigation map to a driver of a vehicle. The relevancy-graded navigation deemphasizes map elements that are not relevant to driving the vehicle. The relevancy-graded navigation map allows the driver to focus more on controlling the vehicle by reducing the amount of time it takes to interpret a navigation map.

17 Claims, 5 Drawing Sheets

SYSTEM AND METHODOLOGIES FOR VISUAL RELEVANCY-GRADING OF A NAVIGATION MAP

BACKGROUND

In-vehicle navigation mapping systems provide real-time feedback of a vehicle's position in relation to the environment and road network. The present disclosure relates to a system, components, and methodologies for displaying a relevancy-graded navigation map to an operator of a vehicle while driving a vehicle.

SUMMARY

According to the present disclosure, a system is provided that presents a navigation map to the driver of a vehicle. The navigation may be displayed on a graphical user interface coupled to the dashboard of the vehicle.

In the illustrative embodiments, every map element of the navigation is assigned a relevancy parameter, and a relevancy-graded navigation map is output to the driver of the vehicle using the relevancy parameters. A relevancy-graded navigation map deemphasizes map elements that are less relevant to the driver by changing the map element according to the relevancy parameter. For example, the relevancy-graded navigation map may include roads that are progressively desaturated according to the relevancy parameter calculated for each section of the road.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description makes reference to the accompanying figures in which.

DETAILED DESCRIPTION

The figures and descriptions provided herein may have been simplified to illustrate aspects that are relevant for a clear understanding of the herein described devices, systems, and methods, while eliminating for the purpose of clarity other aspects that may be found in typical devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. The present disclosure is deemed to inherently include all such elements, variations, and modifications to the described aspects that would be known to those of ordinary skill in the art.

In-vehicle navigation mapping systems provide drivers of vehicles real-time feedback of their position in relation to the surrounding environment and road network. However, while driving the driver must focus on the road ahead and cannot devote much time to deciphering the navigation map. As navigation systems become more advanced, more information is layered on top of the basic navigation map. While the additional information presented in the navigation map may be useful to the driver, the additional information increases the cognitive load experienced by the driver while interpreting the navigation map. The driver's attention is diverted from the important task of driving a vehicle while he or she is sifting through the "noise" of less pertinent information on the navigation map. A navigation map relevancy-grading system is provided to allow the operator of the vehicle to focus on the most pertinent information on the navigation map as quickly as possible.

Figure 5:
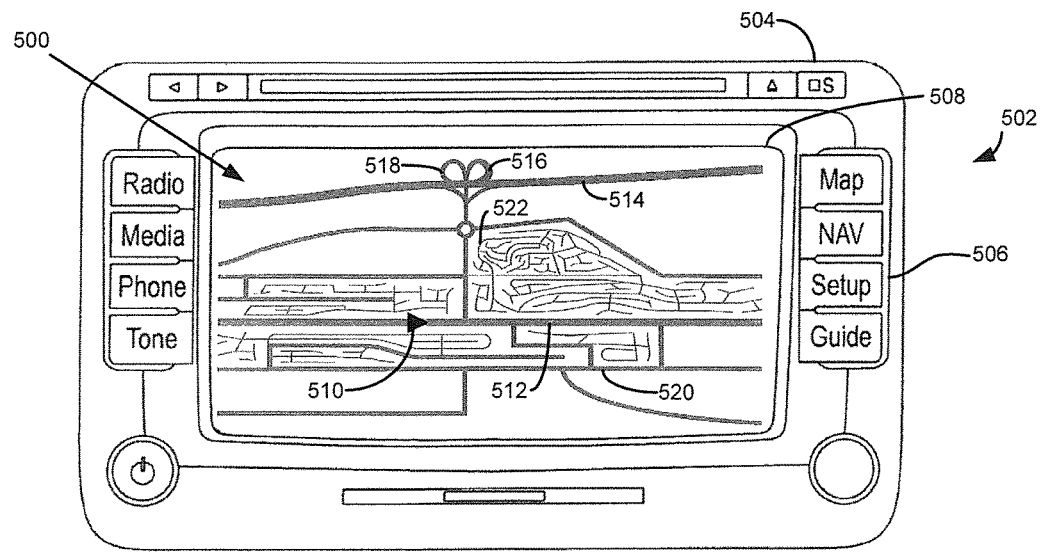
FIG. 5 is a detailed view of an exemplary display of the embodiment of FIG. 1, produced by an embodiment such as that shown in FIG. 2, now showing a map without relevancy-grading, in accordance with the disclosure.
Figure 6:
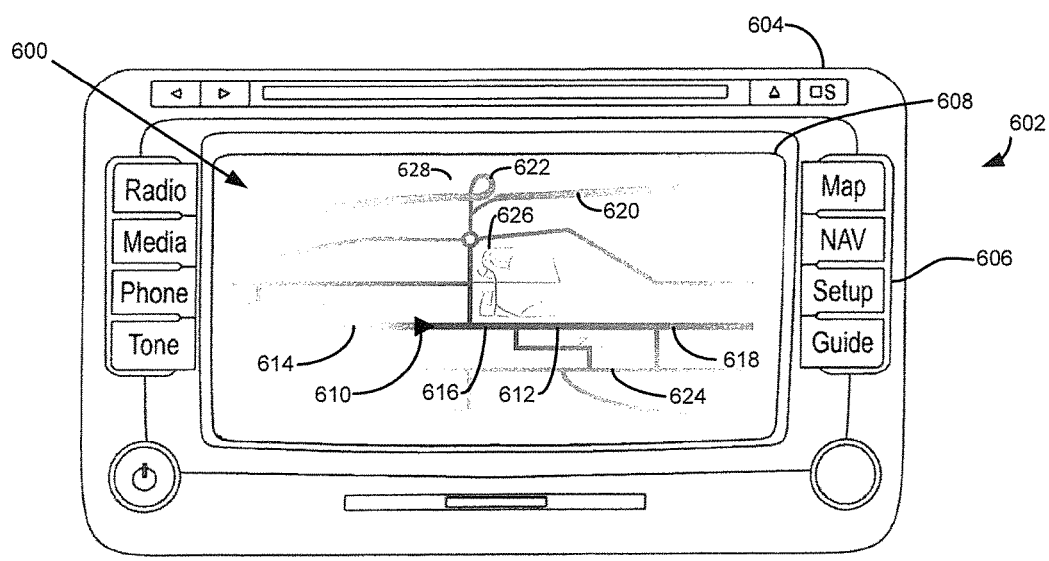
FIG. 6 is a detailed view of an exemplary display of the embodiment of FIG. 1, produced by an embodiment such as that shown in FIG. 2, now showing a map with relevancy-grading, in accordance with the disclosure.

This disclosure specifically teaches reducing the visual complexity of the navigation map output to the driver of a vehicle by emphasizing only roads, and other map elements, that are most relevant to the operator. Roads, and other points of interest, are deemphasized based on many real-time factors to give the driver of the vehicle a better understanding of the relevant road network in the navigation map at a glance. As can be seen in the comparison of FIGS. 5 and 6, many roads are deemphasized by the map element relevancy-grading system to allow the driver to quickly and easily obtain pertinent information.

The navigation map relevancy-grading system may use existing mapping applications and algorithms to determine a number of routes between the current location of the vehicle and an identified destination, and determine the relevancy of the various identified routes. Rating the relevancy of particular roads when a destination has already been identified is particularly useful because the driver of the vehicle has expressly stated a destination for the trip. However, even if a driver is traveling to an unknown destination, it may nevertheless be helpful to the driver to have a quick glance navigation map that deemphasizes less relevant map elements.

Figure 1:
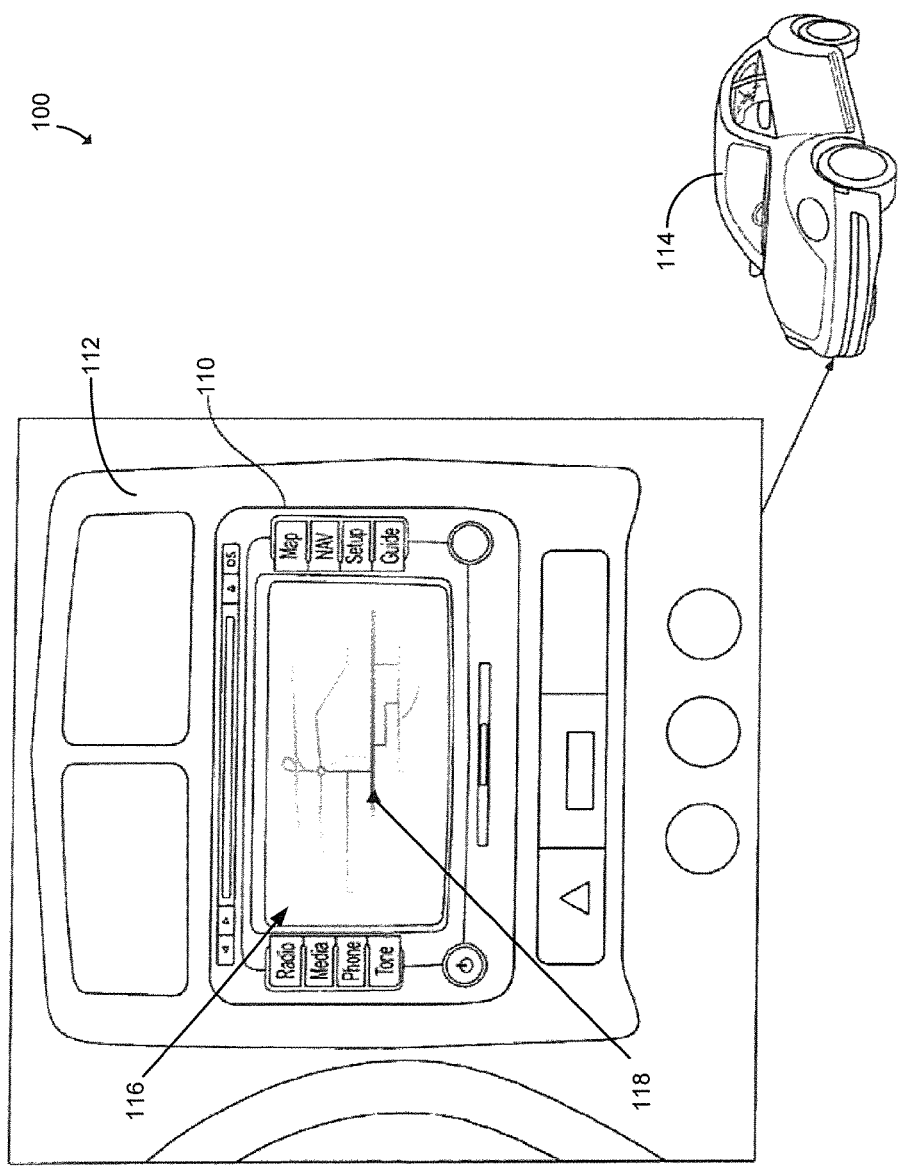
FIG. 1 illustrates an exemplary embodiment of an exemplary system for presenting a relevancy-graded navigation map from a computing device of a vehicle.

FIG. 1 illustrates an exemplary embodiment of an output of a relevancy grading system 100 for an in-vehicle navigation map. The relevancy grading system 100 takes a cognitively heavy in-vehicle navigation map and reduces the cognitive load experienced by the driver by deemphasizing less relevant map elements. As shown, an in-vehicle display unit 110 is integrated into a dashboard 112 of a vehicle 114. A dynamic navigation map 116 with relevancy-grading is presented on the in-vehicle display unit 110, the navigation map 116 showing the current location 118 of the vehicle 114 and selected map elements of the surrounding area, for example, a map element may be a road. In the illustrative embodiment, the roads shown on the navigation map 116 are dynamically deemphasized based on a calculated relevancy parameter of each section of the road. Sections of the displayed roads are progressively desaturated according to the calculated relevancy parameter of each road section. In some embodiments, the relevancy parameter is calculated using the current location and direction of travel of the vehicle 114, the effective driving distance between the vehicle 114 and the road section, and the classification of the road section displayed on the navigation map 116.

Figure 2:
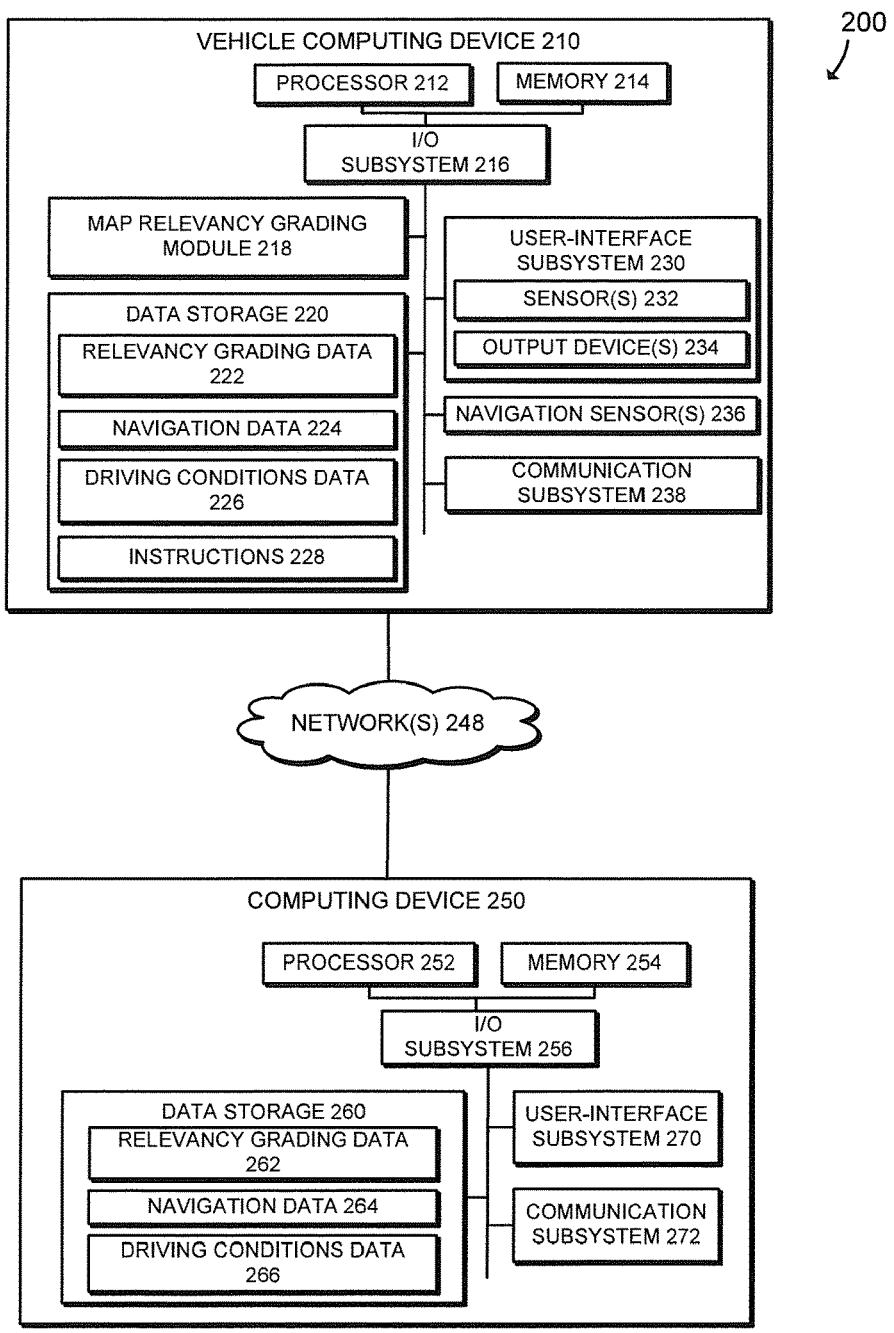
FIG. 2 is a simplified block diagram of an exemplary system for displaying the relevancy-graded navigation map, in accordance with the disclosure.

FIG. 2 is a simplified block diagram of an embodiment of a map relevancy-grading computing system 200. The computing system 200 presents relevancy-graded navigation map to a driver of the vehicle 114, and dynamically adjusts the relevancy-grading of the map elements based on a relevancy parameter that is algorithmically calculated for each map element. Computing system 200 is controlled primarily by computer readable instructions, which may be in the form of software instructions 228 stored on a tangible data storage device 220, such as a magnetic disk hard drive, sold state drive, optical disk, and/or high-speed read only memory (ROM), random access memory (RAM) or the like.

While the illustrative embodiment 200 is shown involving multiple components and devices, it should be understood that the computing system 200 may constitute a single computing device, alone or in combination with other devices. The computing system 200 includes a vehicle computing device 210, which embodies the features and functionality of the map relevancy-grading module 218; however, in other embodiments, the map relevancy-grading module 218 is distributed across multiple computing devices that are connected to the network(s) 248, e.g., vehicle computing device 210 and computing device 250. Each of the computing devices 210 and 250 may be in communication with one another via one or more networks 248 or other types of communication links.

The illustrative vehicle computing device 210 includes at least one processor 212 (e.g. a microprocessor, microcontroller, digital signal processor, etc.), memory 214, and an input/output (I/O) subsystem 216. In some embodiments, the instructions 228 may be executed by the processor 212. In operation, processor 212 fetches and executes instructions and information, and generates and transfers information to and from other resources coupled to or in data communication with the processor. The vehicle computing device 210 may be embodied as any type of computing device capable of performing the functions described herein, such as a vehicle mounted computer, a personal computer (e.g., desktop, laptop, tablet, smart phone, mobile device, body-mounted device, wearable device, etc.), a server, an enterprise computer system, a network of computers, a combination of computers and other electronic devices, or other electronic devices. Although not specifically shown, it should be understood that the I/O subsystem 216 typically includes, among other things, an I/O controller, a memory controller, and one or more I/O ports. The processor 212 and the I/O subsystem 216 are communicatively coupled to the memory 214. The memory 214 may be embodied as any type of suitable computer memory device (e.g., volatile memory such as various forms of random access memory). In some embodiments, the memory 214 is RAM and may temporarily store instructions and data retrieved from slower storage devices as needed for current operations, from which they can be more quickly read and processed by the process or other hardware devices. The I/O subsystem 216 is communicatively coupled to a number of hardware and/or software components, including the components of the computing system shown in FIGS. 1 and 2 or portions thereof.

The I/O subsystem 216 is also communicatively coupled to one or more data storage devices 220 and a communication subsystem 238. It should be understood that each of the foregoing components and/or systems may be integrated with the vehicle computing device 210 or may be a separate component or system that is in communication with the I/O subsystem 216 (e.g., over a network 248 or a bus connection).

The data storage device 220 may include one or more hard drives or other suitable data storage devices (e.g., a magnetic disk hard drive, sold state drive, optical disk, and/or high-speed read only memory (ROM), random access memory (RAM), flash memory, memory cards, memory sticks, or the like). In some embodiments, portions of the computing system 200, reside at least temporarily in the storage device 220, e.g., relevancy-grading data 222, navigation data 242, driving conditions data 226, and instructions 228. In other embodiments, portions of the computing system 200 may be copied to the memory 214 during operation of the vehicle computing device 210, for faster processing or other reasons.

The vehicle computing device 210 includes a user-interface subsystem 230, which includes one or more sensor(s) 232 for detecting user inputs (e.g., a touchscreen, virtual keypad, microphone, camera, buttons, keyboard, mouse, microphone, etc.) and one or more output device(s) 234 (e.g., a touchscreen, displays, speakers, LEDs, etc.). In some embodiments, the one or more sensors 232 include a motion sensor or a camera arranged to detect driver movements, hand gestures, and the like, and/or a microphone to detect verbalizations and other sounds from the driver or other sounds made in the passenger compartment of the vehicle. In general, the user-interface subsystem 230, and sensor(s) 232, may include, for example, a touchscreen display, a touch-sensitive keypad, a kinetic sensor and/or other gesture-detecting device, an eye-tracking sensor, and/or other devices that are capable of detecting human interactions with a computing device.

In some embodiments, the output device 234 is a display implemented with an LCD-based touch sensitive flat-panel display operable to receive inputs, such as a driver's selections, text on a virtual keyboard, or other inputs. Alternative or additional input and output devices may also be included, such as a microphone and speech recognition software for receiving verbal input, a speaker and speech producing software for providing output, and the like. In some embodiments, the sensor 232 and the output device 234 are both the same touchscreen interactive graphical display mounted to the dashboard of a vehicle 114. In other embodiments, the user-interface subsystem 230 is a device not part of a vehicle, but is rather a device in communication with the vehicle through a wireless protocol, including WiFi or Bluetooth.

One or more navigation sensor(s) 236 provide the vehicle computing device 210 information regarding the speed, location, and environment that the vehicle 114 may be operating in. The one or more navigation sensor(s) 236 may include a global positioning system (GPS) module that is operable to determine a geographic position of the vehicle 114, such as by communicating with a plurality of GPS satellites and triangulating the vehicle's location based on the satellites' positions. In other embodiments, the vehicle 114 does not include a GPS module, but the geographic position of the vehicle 114 is obtained by accessing another positioning system through the one or more other network(s) 248. The one or more navigation sensor(s) 236 may also include a speedometer for providing vehicle speed information. Other sensor(s) 236 could also include a light sensor for determining the ambient light outside the vehicle 114, a compass for determining the cardinal direction the vehicle is traveling, or a temperature gauge for determining either an outside temperature or a passenger compartment temperature.

The communication subsystem 238 communicatively couples the vehicle computing device 210 to one or more other devices, systems, or communication networks. The communication subsystem 238 facilitates both communication between the vehicle 114 and other external communication networks, and communication between devices associated with the vehicle 114. For example, the communication subsystem 238 can communicate with external communication networks through AM or FM transceivers, a satellite radio transceiver, a cellular network, a local area network, wide area network, a Near Field Communication (NFC) connection, and/or the Internet. The communication subsystem 238 can facilitate communication between the vehicle computing device 210 and other personal computing devices associated with the vehicle, for example, wired or wireless connections between a passenger's mobile computing device and the vehicle computing device 210, the wireless connections established via WiFi or BLUTOOTH®, or establishing a local WiFi network so that one or more personal computing devices can communicate with each other and with the vehicle computing device 210. Accordingly, the communication subsystem 238 may include one or more short and/or long range wired or wireless (including optical) network interface software, firmware, or hardware, for example, as may be needed pursuant to the specifications and/or design of the particular embodiment of the computing system 200.

The computing device 250 may be embodied as any suitable type of computing device or personal electronic device capable of performing the functions described herein, such as any of the aforementioned types of devices or other electronic devices. For example, in some embodiments, the computing device 250 is a server computing device and may operate and store "back end" portions of one or more of the applications being operated by the vehicle computing device 210, such as the map relevancy-grading module 218. The computing device 250 includes storage media 260, which may be used to store portions of the computing system 200, such as relevancy grading data 262, navigation data 264, and driving conditions data 266. The illustrative computing device 250 also includes a user-interface subsystem 270, and a communication subsystem 272. In general, components of the computing device 250 having the same or similar names to components of the vehicle computing device 210 described above may be embodied similarly. The computing system 200 may include other components, sub-components, and devices not illustrated in FIG. 2 for clarity of the description. In general, the components of the computing system 200 are communicatively coupled as shown in FIG. 2 by signal paths, which may be embodied as any type of wired or wireless signal paths capable of facilitating communication between the respective devices and components.

Figure 3:
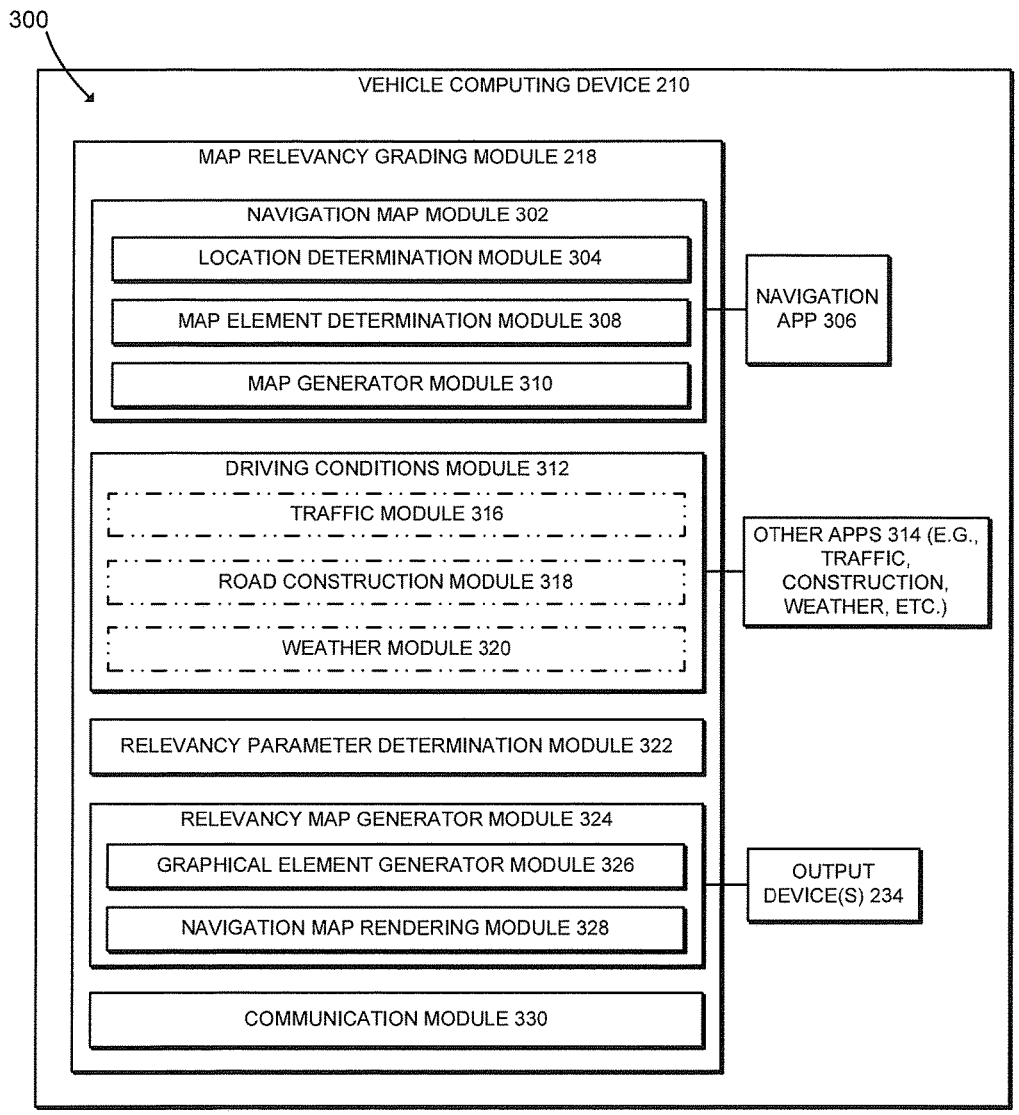
FIG. 3 is a simplified schematic diagram of a computing environment of at least one embodiment of the system of FIG. 1.

Now referring to FIG. 3, in an illustrative embodiment, the vehicle computing device 210 establishes an environment 300 during operation. The illustrative environment 300 includes a navigation map module 302, a driving conditions module 312, a relevancy parameter determination module 322, a relevancy map generator module 324, and a communication module 330. In use, the vehicle computing device 210 is configured to generate a relevancy grade navigation map and output that navigation map to the driver of a vehicle 114. The various modules of the environment 300 may be embodied as hardware, firmware, software, or a combination thereof. For example, the various modules, logic, and other components of the environment 300 may form a portion of, or otherwise be established by, the processor 212 or other hardware components of the vehicle computing device 210.

The navigation map module 302 is configured to generate/receive a navigation map and determine map elements present in the navigation map. In the illustrative embodiment, the vehicle computing device 210 coupled to a vehicle 114, and includes a display output device installed in the dashboard of the vehicle 114. In operation, the navigation map module 302 obtains the location of the vehicle, obtains the navigation map that is related to the current location of the vehicle, and determines what map elements are present in the navigation map.

The navigation map module 302 may include a location determination module 304. The location determination module 304 may be configured to determine the location of the vehicle 114 using, for example, Global Positioning System (GPS) technology. In some embodiments, the location determination module 304 may communicate with GPS hardware system coupled to the vehicle computing device 210. In other embodiments, the location determination module 304 may interface with another application such as, for example, navigation application 306 to obtain the current location of the vehicle 114. The navigation map module 302 can interface with the navigation application 306 through any requisite communication mechanisms and protocols needed for effectuating inter-component, inter-device or network communications. For example, the navigation map module 302 can interface with the Application Programming Interface (API) of a currently running application to obtain the current location of the vehicle. The location of the vehicle 114, as determined by the location determination module 304, may be used to generate the navigation map data that may be used to create the relevancy-graded navigation map.

The navigation map module 302 may include map generator module 308. The map generator module 308 may be configured to generate a navigation map for output on a vehicle mounted display. In some embodiments, the map generator module 308 may be configured to ensure that the generated navigation map is scaled appropriately and includes appropriate amount of detail to be displayed on a vehicle mounted display. Computerized navigation maps are widely used by consumers, for example, GOOGLE-MAPS™, and these computerized navigation maps are highly detailed, containing large amounts of information about nearly every location in the world. As such, it may be inefficient for the vehicle computing device 210 to process relevancy parameters for an entire library of navigation maps every time a relevancy-graded map is required. Accordingly, the map generator module 308 may algorithmically generate a navigation map that is appropriately bounded for the situation. For example, if the driver has input a destination into the vehicle computing device, then the map generator module 308 may populate a navigation map that includes the current location of the vehicle and the destination of the vehicle. In other embodiments, when the driver has not indicated any destination, the map generator module 308 may generate a generic map centered on the current location of the vehicle 114.

In the illustrative embodiment, the map generator module 308 need not create the navigation map, but rather may retrieve the map from another application associated with or used by the vehicle computing device 210 or the computing system 200, for example, navigation application 306. In some embodiments, the navigation application 306 may be the navigation application associated with the vehicle 114. The navigation application 306 may have access to large amounts of map data, either through data storage 220 or through other computing devices such as, for example, computing device 250 and network(s) 248. In some embodiments, the navigation application 306 can map a plurality of routes between the two locations. For example, the navigation application 306 can map a plurality of routes between the current location of the vehicle and a destination input by the driver. In another example, the navigation application 306 can map a plurality of routes between two locations input by the driver.

In an illustrative embodiment, the map generator module 308 may obtain the navigation map by interfacing with the navigation application 306 using the navigation app's 306 application programming interface (API). In other embodiments, the map relevancy-grading module 218 may be a feature of the navigation application 306.

In other embodiments, the map generator module 308 may perform the functions of the navigation application 306, described above, by generating its own navigation map to be used to create a relevancy-graded navigation map. However, every navigation map output by the map generator module 308 may include map elements.

A map element may include any graphical representation on the navigation map, including both physical objects and more abstract ideas such as land use types. For example, map elements include physical objects (e.g., roads, gas stations, restaurants, hotels, other businesses), political boundaries (e.g., country boundaries, city boundaries, or other boundaries for political units), or geological features (e.g., mountains or rivers). Another example of a map element may include land use elements or demographic elements, for example, visual hierarchies that detail whether land is being used for residential or commercial uses. Thus, a map element may include any point of interest that might be relevant to a driver of a vehicle.

In an illustrative embodiment, roads, and road segments, may be a primary type of map element discussed. The map elements of the navigation map can be represented by any type of graphical element.

The number and type of map elements included in the navigation map will depend on the scale of the navigation map. As the scale of the map increases, the amount of detail the map conveys will decrease. For example, for maps output to the dashboard of a vehicle, a map of Central Park in New York City will include more detail about Central Park than a map of all of New York City. In the illustrative embodiment, the map generator module 308 generates, or retrieves, a navigation map that is appropriately scaled, with the appropriate amount of detail. Obtaining an appropriately bounded navigation map from the navigation application 306 can increase the efficiency of the relevancy-grading module 218 by using conventionally known methods related to the scaling of maps to reduce the number of map elements displayed on a map.

In some embodiments, a map element could include a three-dimensional representation of a location. For example, the navigation map may include a street-view option that allows the driver to see the location as it would appear to a person on the ground. In such an example, the three-dimensional map elements (e.g., a building) may be relevancy graded like any other map element.

Once a navigation map has been generated, the map element determination module 310 may receive the navigation map and identify the map elements present in the navigation map. In some embodiments, the map element determination module 310 can extract map elements from metadata associated with the navigation map, or the navigation map may include a structured data type where the information about map elements is embedded directly into the underlying file. In other embodiments, the map element determination module 310 may use computer vision algorithms and techniques to determine information from the graphical representation of the navigation map. The map element determination module 310 may compile a list of all map elements present in the navigation map and pass that information on to the relevancy parameter determination module 322.

The map element determination module 310 may also determine information about the various map elements included in the navigation map. In some embodiments, certain broad types of map element categories may need to be broken into smaller map elements for use by the relevancy-grading module 218. For instance, the navigation map might indicate that a specific road only constitutes a single map element, for example, US Route 66. However, US Route 66 stretches over 2,000 miles, and not all parts of US Route 66 will have the same relevance to a driver in Chicago, for example.

In some embodiments, the map element determination module 310 may parse a road map element into multiple map elements of smaller road sections. For example, the map element determination module 310 may parse a road into smaller geographic road sections, each geographic section may be a map element and may be assigned an individualized relevancy parameter. Calculating a relevancy parameter for each geographic road section enables the map relevancy-grading module 218 to vary how a road is displayed in the relevancy-graded navigation map.

In some embodiments, the map element determination module 310 may determine the characteristics of map elements, for example, classifying roads according to a hierarchy of roads. Roads can be classified into a hierarchy according the road's function and the road's capacities. In general, the classification of a road is based on the road's through-traffic capacity, movement speed, and the access to property the road allows. Freeways may represent the end of the hierarchy with the highest through-traffic capacity, highest speeds, and least amount of access to property, while local roads may allow the most amount of access to property, but often have low through-traffic capacity and low speeds. Thus, a representative hierarchy of roads comprises freeways, arterials, collectors, and local roads. Often, roads with high capacities, such as freeways, will be more relevant to a driver of a vehicle than local neighborhood roads. In other embodiments, the roads may be classified by the navigation application 306, and those classifications may be passed to the map relevancy-grading module 218. Other attributes that the map element determination module 310 can determine about map elements may include the name of the map element, the direction of travel of roads, information regarding a business, like hours of operation, or other driving related information.

The driving conditions module 312 may be configured to receive other information that is pertinent to navigating while driving that is not included in the standard navigation map (e.g., traffic data, construction data, or weather data), and deliver that data to the relevancy parameter determination module 322. After retrieving the driving conditions data, the driving conditions module 312 associates a map element with the driving conditions data, for example, associates road construction information with its corresponding road section map element. In some embodiments, the driving conditions module 312 may obtain the driving condition data by interfacing with other applications 314 associated with the vehicle computing device 210, or connected to the vehicle computing device 210 through the network(s) 248. For example, the driving conditions module 312 can interface with the API of a currently running application 314, or, alternatively, it can start the application 314, retrieve the driving conditions information, and close the application 314 again.

In alternative embodiments, the driving conditions module 312 may include a traffic module 316, a road construction module 318, and a weather module 320 to obtain driving conditions data. The traffic module 316 may be configured to obtain traffic data regarding the roads identified in the navigation map. The traffic module 316 may interact with the communication module 330 to obtain traffic information from a variety of sources, for example, a traffic message channel transmitted on a conventional AM/FM radio channel, a traffic message channel transmitted over satellite radio, or a traffic information service provider, such as INRIX®, accessed through an internet connection (e.g., the Internet may be accessed through a wireless communication network). The road construction module 318 and the weather module 320 may obtain construction and weather information from similar sources as the traffic module 316, and may be similarly embodied. The weather module 320 can also interact with the navigation sensor(s) 236 to locally measure certain weather features such as, for example, measuring the local temperature, measuring temperature changes over time, or measuring the amount of ambient light outside of the vehicle 114.

The relevancy parameter determination module 322 may use the navigation map received from the navigation map module 302, the map elements received from the navigation map module 302, and the other driving condition data received from the driving conditions module 312 to calculate a relevancy parameter for every map element in the navigation map.

Relevancy parameters can be calculated a myriad of different ways and involve a multitude of factors. It is well-known to use static methods to change the map elements displayed on a screen, for example, certain map elements are only displayed at certain zoom levels or user inputs determine which map elements are displayed. The relevancy parameters calculated by the relevancy parameter determination module 322 may be dynamic relevancy parameters that change in real-time with the changes in circumstances that accompany a moving vehicle.

While operating a vehicle, the driver should pay attention to the task of driving the vehicle and not the navigation map. In locations with a large number of roads, i.e., urban locations, a navigation map can be cluttered with all kinds of information, including, for example, other small roads that are not likely to be taken by the driver. The relevancy parameter determination module 322 uses factors such as, for example, the effective driving distance between the current location of the vehicle and the map element and the classification type of the map element to determine relevancy parameters for each map element.

For example, a factor to determine relevancy includes the pertinence of the map element to operating a vehicle. Certain elements shown on maps, while interesting, may have no value to a driver operating a vehicle, e.g., a nearby museum or law office. In some embodiments, the relevancy parameter determination module 322 can assign a relevancy parameter by only knowing what type of map element is being assessed. Certain businesses like, for example, gas stations, hotels, and restaurants are generally more relevant to drivers than other businesses such as, for example, a law office. When a driver is driving in an unknown area looking for a specific location, many map elements are not relevant to the driver's decision-making, and the relevancy parameter determination module 322 will assign a low relevancy parameter to the map element without assessing other information. In some embodiments, a factor to determine the relevancy parameter can include whether or not the map element is the desired destination of the driver. If the map element is the stated destination of the driver, then the relevancy parameter determination module 332 may give a high relevancy parameter to that map element.

Other map elements may need more information to determine their relevancy to a driver. For example, a factor to determine a relevancy parameter for a gas station includes the map element's effective distance from the current location of the vehicle. The effective distance between a map element and the vehicle 114 is determined by assessing the driving distance between the vehicle and the map element, for example, while a map element might only be a half-mile away it could be on the other side of the river, and the effective driving distance to the map element might be several miles because of where the bridges crossing the river are located. When using the effective driving distance to determine the relevancy parameter of a map element, the relevancy parameter determination module 322 determines the location of the vehicle, determines the location of the map element, and weights closer map elements as more relevant than far away map elements. In some embodiments, the direction of travel of the vehicle is also helpful to know because map elements that were just passed by a vehicle can be a farther effective driving distance away than map elements being approached by the vehicle 114. Furthermore, the speed and direction of travel of a vehicle may be important to know when assessing the relevancy parameters for one-way roads, such as freeway on-ramps. For example, when a vehicle is approaching a freeway from a city street, the freeway exit ramps may be assigned a very low relevancy parameter, while the freeway on-ramps may be assigned a high relevancy parameter. Conversely, if the vehicle is traveling along the freeway, the exit ramps may be assigned a high relevancy parameter, while the freeway on-ramps may be assigned a low relevancy parameter.

Another factor that the relevancy parameter determination module 322 may consider is the classification of the road. In general, roads of higher classes may be assigned higher relevancy parameters by the relevancy parameter determination module 322, for example, freeways may be assigned a higher relevancy parameter than the relevancy parameter assigned to local roads.

In some embodiments, the relevancy parameter determination module 322 uses both road classifications and effective distance factors to determine a relevancy parameter. For example, as the effective driving distance increases between a road map element and the current location of the vehicle, roads with a lower classification, e.g., local roads, will lose relevancy faster than roads with a higher classification, e.g., freeways. This is because roads with higher classifications are more likely to be an effective route to a destination than local roads. An illustrative example the factors of effective driving distance and road classifications combining to cause local roads to lose relevancy faster than collector or arterial roads is seen by comparing FIGS. 5 and 6.

Another factor that the relevancy parameter determination module 322 uses to determine a relevancy parameter is the driving conditions data collected by the driving conditions module 312. In some embodiments, roads, or road segments, with congestion or road construction will be assigned a lower relevancy parameter, thereby deemphasizing the congested routes. In other embodiments, the relevancy parameter determination module 322 can assign map elements that might be experiencing congestion, construction, or certain weather conditions, e.g., snow, a unique relevancy parameter that will then be displayed to the driver using a unique graphical element, communicating the driving condition data directly to the driver.

In some embodiments, the relevancy parameter determination module 322 uses destination data and route data to determine the relevancy parameter of a map element. As discussed above, destinations input into the system will be given a high relevancy parameter. In some embodiments, a plurality of routes may be calculated between the current location of the vehicle and the indicated destination. When a plurality of routes are indicated on the navigation map, then the relevancy parameter determination module 322 may assign a higher relevancy parameter to the road segment map elements that are included in the plurality of routes.

Other relevancy factors that may be used by relevancy parameter determination module 322 also include information gained from machine learning algorithms. Frequently used destinations and roads can be recognized by the vehicle computing device 210 and used to determine the relevancy parameter of map elements. For example, frequently used roads will be assigned a higher relevancy parameter than other roads.

Another factor that can be used by the relevancy parameter determination module 322 may be provided by comparing the class of road currently being traveled to other nearby road classifications. For example, if a vehicle is driving on a road that is classified as an arterial road, then the relevancy parameter determination module 322 may assign other roads of lower classes a lower relevancy parameter because it is likely that the driver is using the arterial road to move through the location. However, if the vehicle is driving on a road that is classified as a local road, then other local roads are more likely to be relevant. In use, if a vehicle turns off of an arterial road and onto a local road, the relevancy parameter determination module 322 may dynamically recalculate the relevancy parameters for nearby road map elements, and local roads that used to be deemphasized may be made more visible to the driver.

The relevancy map generator module 324 may receive the navigation map, the map elements, and the relevancy parameters and output a relevancy-graded navigation map to the output(s) 234 of the vehicle computing device 210. The relevancy map generator module 324 may include a graphical element generator module 326 and a navigation map rendering module 328. The graphical element generator module 326 may receive a map element, determine the type of map element present, create a graphical element related to that map element type, receive the relevancy parameter of the map element, determine a graphical change to make to the graphical element based on the relevancy parameter, and generate a relevancy-graded graphical element. For example, freeways will have a different graphical element than gas stations will, and even different classes of roads will have different graphical elements. In some embodiments, the exact graphical elements are not independently determined by the graphical element generator module 326, but rather the graphical elements are received from the navigation application 306. In these instances, the graphical element information may be passed to the relevancy map generator module 324 as part of the navigation map data that is received from the navigation application 306.

The graphical element generator module 326 may apply one of several types of relevancy grading visual indicators to the graphical elements associated with map elements. In some embodiments, relevancy grading visual indicators applied to the graphical elements of map elements include changing the opacity, saturation, or size of a map element. For example, the most relevant map elements may be completely visible to the driver, but as the relevancy parameter decreases the graphical element generator module 326 may desaturate the graphical element. Color saturation refers to the intensity of color in an image. To desaturate a graphical element means to reduce the color intensity of the graphical element by mixing the color of the graphical element with the color white. In other embodiments, other types of visual indicators may also be used to indicate the relevancy parameter assigned to a map element such as, for example, changing the color of the graphical element, changing the style of the graphical element, or changing the border of the graphical element.

The navigation map rendering module 328 may receive the relevancy-graded graphical elements generated by the graphical element generator module 326 and render a complete navigation map to output to the driver. In some embodiments, the navigation map rendering module 328 may apply smoothing algorithms to the graphical elements to increase the readability of the relevancy-graded navigation map. For example, after parsing the map into map elements and generating a relevancy-graded graphical element for each map element, the relevancy-graded graphical elements might be visually choppy when placed next to each other. Thus, the navigation map rendering module 328 may assess the relevancy-graded navigation map for readability and modifies the appearance of individual relevancy-graded graphical elements to match neighboring relevancy-graded graphical elements.

The communication module 330 may be configured to enable the map relevancy-grading module 218 to communicate with other applications on the vehicle computing device 210, other hardware that is part of the vehicle computing device 210, or communicate with other computing devices through network(s) 248. The communication module 330 may be configured to use any one or more communication technology (e.g., wired or wireless communications) and associated protocols (e.g., AM/FM radio, cellular network protocols, Ethernet, BLUETOOTH®, WI-FI®, etc.) to effect such communication. The communication module 330 may also be configured to communicate with other applications such as, for example, navigation applications 306 and other applications 314. The communication module 330 can communicate with the navigation application 306 and other applications 314 when those components are located locally onboard the vehicle computing device 210, or when they are located remotely on a different computing device, for example, computing device 250.

Figure 4:
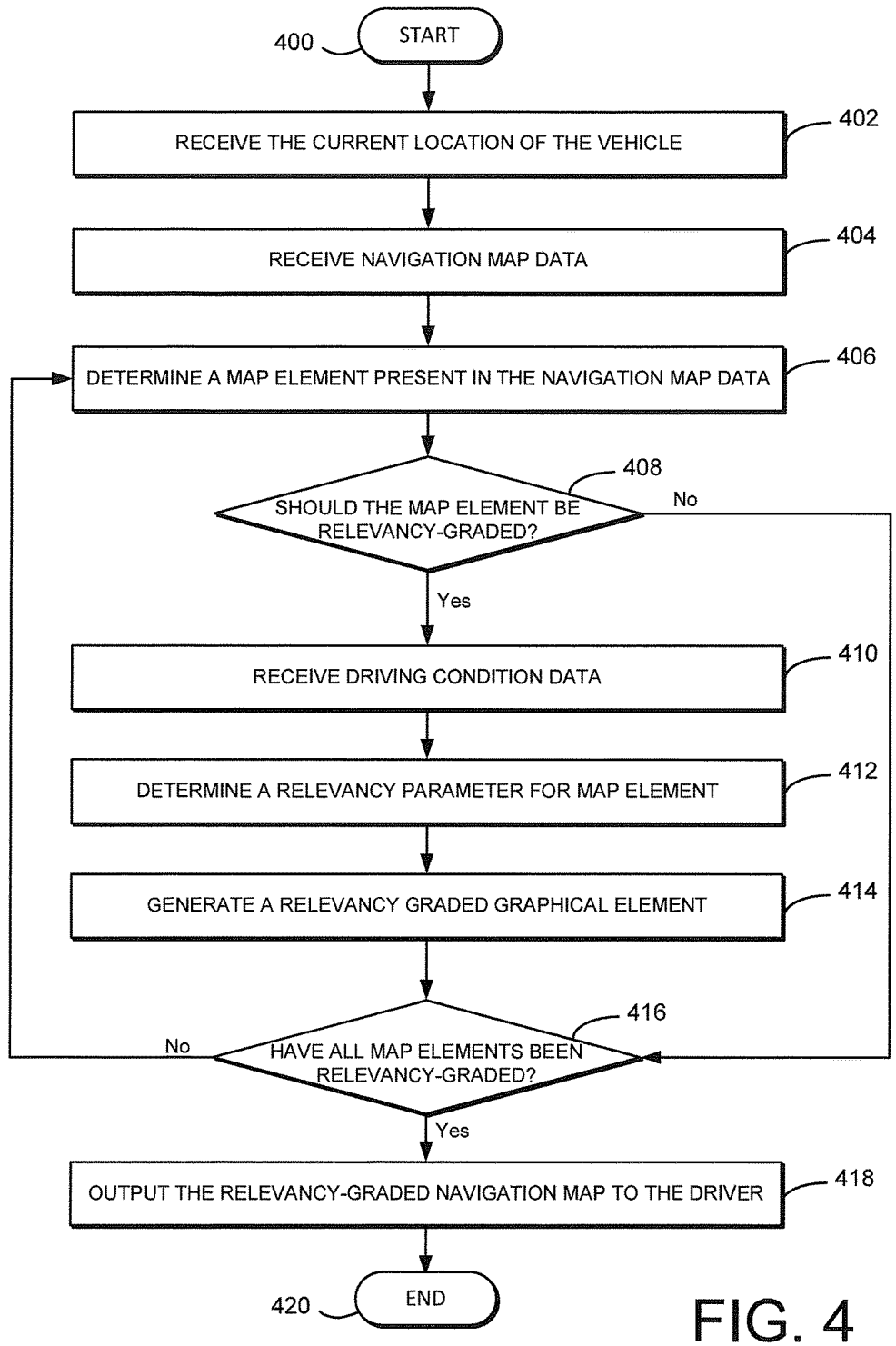
FIG. 4 is a simplified block diagram of a method for generating a relevancy-graded navigation map, such as might be performed by the system of FIG. 1, in accordance with the disclosure.

Referring now to FIG. 4, in use, the map relevancy-grading computing system may execute a method for presenting a relevancy-graded navigation map to a driver of a vehicle. The method begins at 400 and control proceeds to 402, at which the computing system receives the current location of the vehicle. In some embodiments, this may be performed through a dedicated GPS system. Control then proceeds to 404, at which navigation map data is received. The navigation map data may be received from another navigation application (e.g., navigation application) or the relevancy-grading module may generate the navigation map. The current location of the vehicle may be used to generate a navigation map because, it may be determined, that the most relevant points of interest to a driver are included in the area that the driver is currently driving in. When receiving the navigation map data, the vehicle computing device may ensure that the navigation map is properly scaled, and include an appropriate amount of detail for scale of the navigation map.

Operations performed at 408, 410, 412, 414, 416 represent processes that can be applied to individual map elements either iteratively or concurrently. Thus, at 406, a number of map elements present in the navigation map is determined. A map element may include anything represented on a navigation map using a graphical element. For example, map elements may include roads, places of business (e.g., gas stations, hotels, or restaurants), cities and other political boundaries, etc. Once a map element has been identified, at 408, a determination is made if the map element is in a category that a driver would need to know about. If the map element is not part of a category of navigation map elements that drivers typically care about, then the map element is not displayed to the driver of the vehicle and control proceeds to 416. For example, drivers typically care about roads and gas stations, not about museums or law offices. If the map element is to be displayed, control proceeds to 410.

At block 410, the computing system receives driving conditions data (e.g., traffic data, road construction data, or weather data) and associates that driving condition data with specific map elements (e.g., road section map elements). The driving conditions data may be used to determine the relevancy parameters. Roads with traffic congestion, road construction, and weather conditions may receive a lower relevancy parameter because of the detected adverse conditions.

Control then proceeds to 412, at which the computing system determines a relevancy parameter for each qualifying map element present in the navigation map. Higher relevancy parameters may relate to map elements that are more relevant to the driver of a vehicle and lower relevancy parameters may relate to map elements that are less relevant to the driver of the vehicle. At least some relevancy parameter determinations are based on the effective driving distance between the vehicle and the map element, and the classification of the map element (e.g., the classification of the road section in question). For example, a freeway (a road map element that has a high classification in a road hierarchy) that is near the current location of the vehicle will receive a higher relevancy parameter than perhaps another road that is farther away. In some embodiments, the street that the vehicle is currently traveling on and other nearby streets of the same class receive the highest relevancy parameters, with relevancy parameters gradually decreasing as the map element has a farther effective driving distance away from the vehicle.

Control then proceeds to 414, at which a relevancy-graded graphical element is generated for each map element with a relevancy parameter. In some embodiments, the relevancy-graded graphical element may be merely the standard navigation map graphical element with a modification applied to the graphical element, for example, changing the opacity, saturation, or the size of the standard navigation map graphical element according to the calculated relevancy parameter of the map element. For example, decreasing the saturation of the graphical element of a map element according to the calculated relevancy parameter may result in the graphical elements with the highest associated relevancy parameters being more saturated than graphical elements with low associated relevancy parameters. Presenting a relevancy-graded navigation map to the driver may reduce the amount of thinking a driver must do to interpret the navigation map and allows the driver to focus more on the task of driving a vehicle. By using the processing power of the computing system to relevancy-grade the navigation map, the cognitive load necessary to interpret the navigation map is effectively shifted from the driver to the computing system. In other embodiments, different graphical elements can be rendered for certain relevancy parameters, for example, if a map element (e.g., a road) is under construction a construction graphical element may be generated for the map element.

Control proceeds to 416, at which a determination is made whether all of the qualifying map elements have been assigned relevancy parameters in a relevancy-graded graphical element generated for the map element. If all of the map elements have not been processed, then a determination is made which map elements have not been relevancy-graded by re-executing the processes of 406-414.

Otherwise, at 418, the complete relevancy-graded navigation map is output to the driver of the vehicle. For example, this may be performed using the output device 234 associated with the vehicle 114 (e.g., a dashboard mounted vehicle display) and illustrated in FIG. 2.

A comparison of FIGS. 5 and 6 illustrates differences between a standard navigation map 500 and an illustrative embodiment of a relevancy-graded navigation map 600. Referring now to FIG. 5, a vehicle computing device 502 of a vehicle 114 is shown. The vehicle computing device 502 includes a frame 504, a plurality of buttons 506 and a display 508. On the display 508 is output the standard navigation map 500. A vehicle graphical element 510 on the standard navigation map 500 marks the current location of the vehicle 114. In some embodiments, the current location of the vehicle graphical element 510 also indicates the direction of travel of the vehicle 114, for example, the vehicle graphical element 510 may be an arrow pointing in the direction of travel of the vehicle. The standard navigation map also includes a number of road map elements. For example, the vehicle 114 is currently traveling on an arterial road 512. A freeway 514 is at the located at the top of the display 508, and includes on-ramps 516 and off-ramps 518. The standard navigation map 500 also includes a plurality of collector roads 520 and a plurality of local roads 522.

Referring now to FIG. 6, the relevancy-graded navigation map 600 is shown output on a vehicle computing device 602 of a vehicle 114, the vehicle computing device 602 being similarly embodied to the vehicle computing device 502; thus, the vehicle computing device 602 includes a frame 604, a plurality of buttons 606, and a display 608. However, the relevancy-graded navigation map 600 is output to the driver on the display 608, and lower relevancy parameters are presented by varying the saturation of the graphical elements (e.g., map elements with lower relevancy parameters are less saturated than map elements with higher relevancy parameters). A vehicle graphical element 610 marks the current location of the vehicle 114, and other graphical elements of the navigation map are modified according to their calculated relevancy parameter. The vehicle 114 is currently traveling on an arterial road 612.

As compared to FIG. 5, the graphical representation of the arterial road 612 varies along the length of the arterial road 612. In the illustrative embodiment, the road section 614 immediately ahead of the vehicle 114, according to the vehicle's indicated direction of travel, may be represented by the darkest lines on the relevancy-graded navigation map 600, meaning that the road section 614 is the most relevant to the driver. A road section 616 farther ahead of the vehicle 114 slowly becomes desaturated as the effective driving distance to the road section 616 increases. A road section 618 immediately behind the vehicle graphical element 610 is almost completely desaturated, because it has been assigned a low relevancy parameter. In other embodiments, the road section 618 may be deemed to be more relevant to the driver because the driver may have just missed a turn.

Other map elements, which in the illustrative embodiment are other roads, may be displayed according to their calculated relevancy parameters. A freeway 620 may be shown as a fading line because points on the freeway that are farther away from the vehicle 114 are less relevant than points closer to the vehicle. On-ramps 622 are shown clearly in relevancy-graded navigation map 600, but the off-ramps 628 from FIG. 5 may not be shown in the relevancy-graded navigation map are heavily deemphasized because they may be irrelevant to the driver, given the current location of the vehicle 114. In general, collector roads 624 may fade more quickly than the arterial roads 612 and the freeways 620, and local roads 626 may fade the quickest of all. All of the changes in the saturation of the graphical elements are related to changes in the relevancy parameters.

As can be seen in the comparison of FIGS. 5 and 6, the local road networks 522, 626 may fade the more quickly than any other road type, as the effective driving distance to the road section map element increases.

In some embodiments, the relevancy-grading module 218 illustrated in FIG. 2 may not provide a user-selectable feature that is directly built into the vehicle navigation system (e.g., the navigation application 306). In use, the relevancy-grading module 218 may not generate a relevancy-graded navigation map 600 without an indication from the driver that a relevancy-graded navigation map is desired. For example, a driver can select a button on the vehicle computing device 502, 602 or enter a voice command to initiate the relevancy-grading module 218. In other embodiments, the relevancy-grading module 218 can be set to automatically execute after a triggering condition has been met. For example, the relevancy-grading module 218 can be set to execute only after the vehicle reaches a certain speed. Thereby ensuring that while the vehicle 114 is moving, the cognitive load of the navigation map is reduced for the driver.

The relevancy-grading module 218 can also include a number of other features, such as user-selectable features to customize the relevancy-graded navigation map. The computing system 200 can use machine learning techniques to remember common routes and destinations and adjust the relevancy parameters of those map elements accordingly. In some embodiments, the driver can input direction as to how the relevancy parameters are output to the driver. For example, the driver can adjust the rate of opacity change in the graphical elements according to the relevancy parameter, or the driver can change any number of different features about the relevancy-graded graphical elements. In yet another example, the driver can select that tunnels and bridges get low relevancy parameters.

The technical challenge is to provide a means for determining the relevancy of each map element present in a navigation map, obtaining information regarding the display preferences of the driver, and creating a new navigation map that dynamically displays the relevancy of each map element, thereby reducing the cognitive load experienced by the driver while interpreting the navigation map, and keep the driver's attention on the task of driving.

Disclosed embodiments provide a solution to the above-described technical problems by providing an in-vehicle system for relevancy-grading the map elements of a navigation map, obtaining information regarding the location of the vehicle, the traveling speed and direction of the vehicle, the travel conditions, the desired location of the driver, and information about the map elements from a plurality of sources, analyzing these data, and displaying a navigation map that dynamically displays every map element according to its calculated relevance.

As used herein, "app," "application" or "computer application" may refer to, among other things, any type of computer program or group of computer programs, whether implemented in software, hardware, or a combination thereof, and includes self-contained, vertical, and/or shrink-wrapped software applications, distributed and cloud-based applications, and/or others. Portions of a computer application may be embodied as firmware, as one or more components of an operating system, a runtime library, an application programming interface (API), as a self-contained software application, or as a component of another software application, for example.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like are referred to as such for ease of discussion, and are not intended to imply that any specific implementation details are required. For example, any of the described modules and/or data structures may be combined or divided into sub-modules, sub-processes or other units of computer code or data as may be required by a particular design or implementation. In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instructions or modules may be implemented using any suitable form of machine-readable instruction, and each such instruction may be implemented using any suitable programming language, library, API, and/or other software development tools or frameworks.

Similarly, schematic elements used to represent data or information may be implemented using any suitable electronic arrangement or data structure. Further, some connections, relationships or associations between elements may be simplified or not shown in the drawings so as not to obscure the disclosure. This disclosure is to be considered as exemplary and not restrictive in character, and all changes and modifications that come within the spirit of the disclosure are desired to be protected.

The invention claimed is:

1. A system for outputting a relevancy-graded navigation map, comprising:
   a transceiver to receive map data, vehicle location data, and road data, the map data being indicative of a navigation map configured to be output to an operator of a vehicle inside the vehicle, the map data comprising map elements, each map element indicating a feature of interest to the operator of the vehicle on the navigation map, the location data being indicative of the current location of the vehicle, and the road data being indicative of one or more changeable road conditions;
   means for determining a relevancy parameter for each map element based on the map data related to the map element, the location data, and the road data, and creating a relevancy-graded navigation map using the relevancy parameters;
   a graphical user interface coupled to the vehicle for controlling the output of the relevancy-graded navigation map to the operator of the vehicle and dynamically displaying the relevancy of each map element as the relevancy parameters change in real-time, the dynamic displaying of the relevancy including changing at least one of the an opacity, a saturation, or a color of each map element in response to a real time-time change in relevancy parameter, wherein the relevancy parameter and resulting display of relevancy is determined, at least in part, based on the relevance of each map element to operating the vehicle and
      a trigger module to generate trigger data after detecting an occurrence of one or more conditions in the vehicle, wherein relevancy parameters are not determined for each map element until the trigger data has been generated,
   wherein the one or more conditions includes whether the vehicle is moving at or above a certain speed.

2. The system of claim 1, wherein a first plurality of map elements represent a plurality of roads indicated in the map data of the navigation map.

3. The system of claim 2, wherein the map data related to each of the plurality of roads includes data indicating a classification of the road on the speed of the road, the capacity of the road, and the access to property provided by the road.

4. The system of claim 2, wherein the road data includes data about each of the plurality of roads indicated in the map data and includes traffic data related to each of the plurality of roads, construction project data related to each of the plurality of roads, and weather data related to each of the plurality of roads.

5. The system of claim 2, wherein the relevancy parameter of each map element includes a likelihood that the operator of the vehicle will travel near the map element, the likelihood being based on an effective driving distance between the vehicle and the map element, and determining a classification of the map element.

6. The system of claim 5, wherein the relevancy parameter of each map element is also based on data indicating a likelihood the vehicle will travel along one of the plurality of roads based on one or more routes outlined between the current location of the vehicle and a destination of the vehicle input by a user.

7. The system of claim 1, wherein a second plurality of map elements represent a plurality of points of interest to the operator of the vehicle including a restaurant, a gas station, and a hotel.

8. The system of claim 1, comprising a location determination module to determine the location data of the vehicle, the location data indicative of the current position of the vehicle, the current rate of travel of the vehicle, and the current direction of travel of the vehicle.

9. The system of claim 1, wherein the relevancy-graded navigation map comprises one or more relevancy-graded map elements, each map element including graphics data indicative of a visual representation of the map element output to the operator of the vehicle, wherein the graphics data of each relevancy-graded map element is different than the graphics data of each corresponding map element.

10. A system for outputting a relevancy-graded navigation map, comprising:
    a navigation map module to receive map data and road data, the map data being indicative of a navigation map configured to be output to an operator of a vehicle, the map data comprising one or more map elements that indicate features of interest to the operator of the vehicle, each map element comprising data indicative of a map element type and data indicative of a graphic related to the map element, and the road data being indicative of one or more changeable road conditions;
    a location determination module to determine location data of the vehicle, the location data indicative of the current position of the vehicle, the current rate of travel of the vehicle, and the current direction of travel of the vehicle;
    a relevancy parameter determination module to determine a relevancy parameter for each map element based on the map data related to the map element, the location data, and the road data;
    a relevancy map module to generate relevancy-graded map elements by modifying the data indicative of the graphic of each map element based on the relevancy parameter of each map element, and control the generation of a relevancy-graded navigation map using the relevancy-graded map elements;
    a graphical user interface coupled to the vehicle for outputting the relevancy-graded navigation map to the operator of the vehicle; and
    a trigger module to generate trigger data after detecting an occurrence of one or more conditions in the vehicle, wherein relevancy parameters are not determined for each map element until the trigger data has been generated,
    wherein the one or more conditions includes whether the vehicle is moving at or above a certain speed.

11. A method of displaying a navigation map on an in-vehicle system comprising:
    receiving map data and location data, the map data being indicative of a navigation map configured to be output to an operator of a vehicle, the map data comprising one or more map elements, each map element comprising data indicative of a map element type and data indicative of a graphic related to the map element, and the location data being indicative of a current position of the vehicle;

determining a relevancy parameter for each map element based on the map data and the location data;

for each map element, generating a relevancy-graded map element based on the relevancy parameter by modifying the data indicative of the graphic for each relevancy-graded map element;

controlling the generation of a relevancy-graded navigation map using the relevancy-graded map elements;

detecting whether a triggering condition exists, wherein determining a relevancy parameter only occurs when the triggering condition exists, and wherein the triggering condition includes whether the vehicle is moving at or above a certain speed.

12. The method of claim 11, further comprising outputting the relevancy-graded navigation map to a graphical user interface associated with an operator of the vehicle.

13. The method of claim 11, further comprising receiving driving conditions data that includes traffic patterns on a plurality of roads included in the map elements, construction being performed on the plurality of roads, and weather experienced by the plurality of roads.

14. The method of claim 11, comprising receiving a destination of the vehicle and receiving one or more determined routes between the current location of the vehicle and the destination of the vehicle.

15. The method of claim 11, wherein determining the relevancy parameter comprises determining the effective driving distance between the vehicle and each map element; and determining a classification of each map element.

16. The method of claim 11, further comprising receiving data regarding the speed and the direction of travel of the vehicle.

17. A road relevancy mapping module embodied in one or more non-transitory machine accessible storage media, the road relevancy mapping module comprising instructions executable by one or more processors to cause an electronic device to:

receive map data and location data, the map data being indicative of a navigation map configured to be output to an operator of a vehicle, the map data comprising one or more map elements, each map element comprising data indicative of a map element type and data indicative of a graphic related to the map element, and the location data being indicative of a current position of the vehicle;

determine a relevancy parameter for each map element based on the map data and the location data;

for each map element, generate a relevancy-graded map element based on the relevancy parameter by modifying the data indicative of the graphic for each relevancy-graded map element;

control the generation of a relevancy-graded navigation map using the relevancy-graded map elements automatically once a triggering condition is met, the triggering condition includes whether the vehicle is moving at or above a certain speed; and output the relevancy-graded navigation map to a graphical user interface associated with the operator of the vehicle.

* * * * *